(No Model.) 2 Sheets—Sheet 1.

J. G. WALTER.
TOOL FOR CUTTING IRREGULAR GROOVES IN ROLLS OF ROLLING MILLS.

No. 578,088. Patented Mar. 2, 1897.

Witnesses
Geo. E. Fuchs
A. B. Smith

Jacob G. Walter, Inventor
By H. B. Willson,
Attorney (No Model.) 2 Sheets—Sheet 2.
J. G. WALTER.
TOOL FOR CUTTING IRREGULAR GROOVES IN ROLLS OF ROLLING MILLS.
No. 578,088. Patented Mar. 2, 1897.
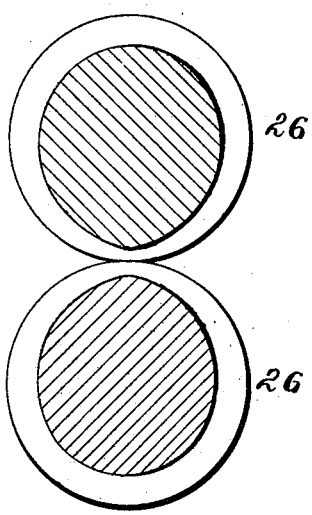
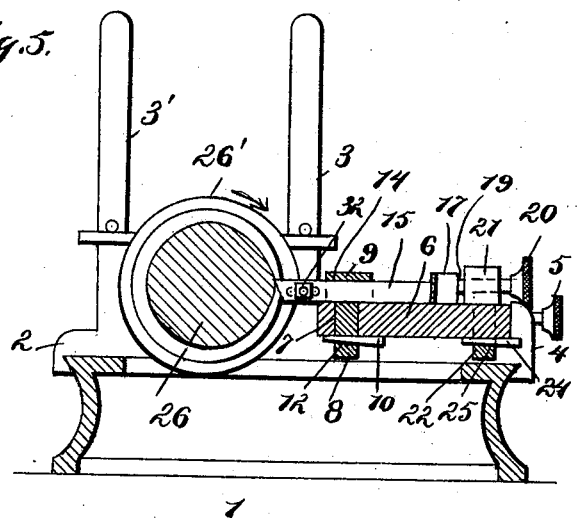
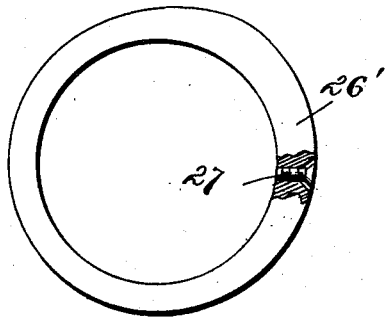
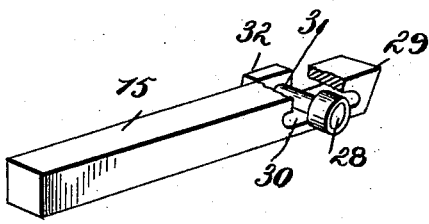
Witnesses
Geo. E. Frech
A. B. Smith
Inventor
Jacob G. Walter
By H. B. Willson
Attorney

UNITED STATES PATENT OFFICE.

JACOB GILBERT WALTER, OF ALTOONA, PENNSYLVANIA.

TOOL FOR CUTTING IRREGULAR GROOVES IN ROLLS OF ROLLING-MILLS.

SPECIFICATION forming part of Letters Patent No. 578,088, dated March 2, 1897.

Application filed July 14, 1896. Serial No. 599,114. (No model.)

*To all whom it may concern:*

Be it known that I, JACOB GILBERT WALTER, a citizen of the United States, residing at Altoona, in the county of Blair and State of Pennsylvania, have invented certain new and useful Improvements in Tools for Cutting Irregular Grooves in the Rolls of Rolling-Mills; and I do declare the following to be a full, clear, and exact description of the invention, such as will enable others skilled in the art to which it appertains to make and use the same.

My invention has relation to improvements in tools for cutting irregular grooves in the rolls of rolling-mills for rolling brake-levers for street-railway cars and like articles; and the object is to provide a tool for cheaply, simply, and expeditiously forming the irregular grooves in said rolls required in the production of said brake-levers and the like.

To this end the novelty consists in the construction, combination, and arrangement of the same, as will be hereinafter more fully described, and particularly pointed out in the claims.

In the accompanying drawings the same figures of reference indicate the same parts of the invention.

Figure 1:
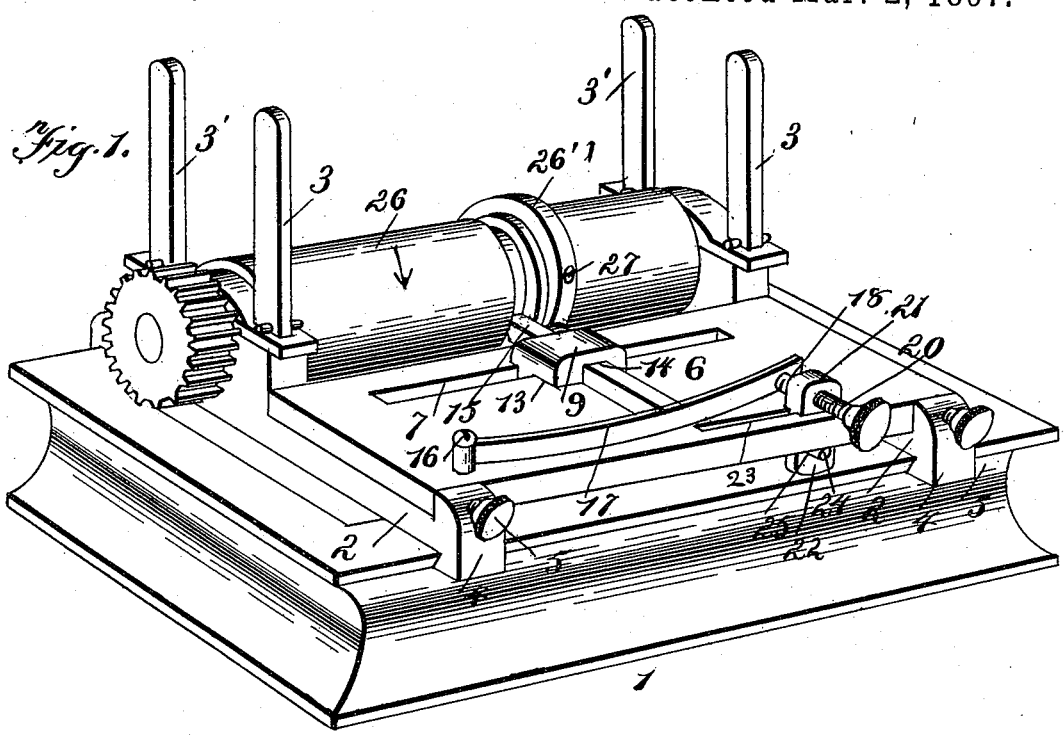
Figure 2:
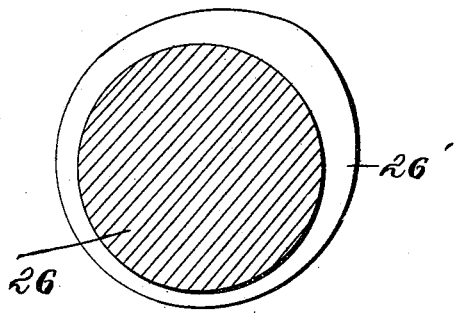
Figure 3:
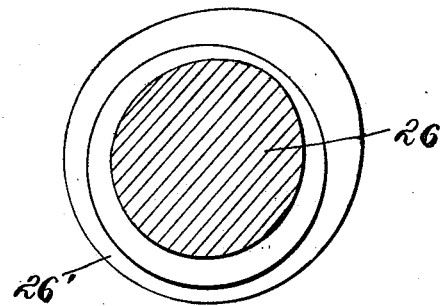
Figure 6:
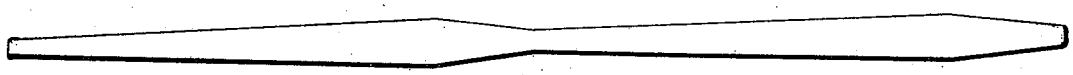

Figure 1 is a perspective view of a device embodying my invention. Fig. 2 is a cross-section of a roll with the templet or pattern in place. Fig. 3 is a similar view showing the templet or pattern in place and the groove cut corresponding to the pattern. Fig. 4 is a cross-section of a pair of the rolls with the irregular groove cut in them and in their relative relation to each other. Fig. 5 is a cross-section of the roll on the line of the cutting-tool. Fig. 6 is a plan view of a pair of the lever-blanks as they come from between the rolls. Fig. 7 is a plan view of the templet or pattern detached from the roll, and Fig. 8 is a perspective view of the grooving-tool detached from the tool-post.

1 is the bed-frame, on which are mounted the cross-arms 2 2, having dovetail depending jaws, which engage the dovetail flange on the upper longitudinal parallel edges of the bed-frame. Each arm is provided with the standards 3 3' and an integral lug 4, having a lag-screw 5.

6 is the tool-rest, and it consists of a flat metal plate adjustably secured in place on the cross-arms, between the front standards 3 3 and the lugs 4 4, by means of the lag-screws 5. It will thus be seen that the cross-arms 2 2, carrying the standards, can be adjusted to and from each other to correspond to the length of the rolls to be grooved.

7 is a longitudinal slot in the plate 6 through which the rectangular leg 8 of the tool-post 9 extends, it being first adjusted longitudinally and then rigidly secured in said slot by a taper-key 10, passing through a slot 12 in the leg 8, clamping the shoulders 13 of the tool-post down firmly on the face of the plate 6. This tool-post is provided with a transverse rectangular slot 14, the bottom of which extends across the slot in the plate 6 on a line slightly below the line of the face of said plate, so that when the grooving-tool 15 is inserted in the slot in the tool-post its bottom side rests upon the face of the plate 6 and slides freely thereon through the slot 14 in the tool-post, it having no lateral or up-and-down motion whatever, but simply a longitudinal sliding motion in its own plane back and forth through the tool-post.

16 is a stud on the face of the plate 6, to which is secured one end of a flat spring 17, which extends longitudinally along the plate, and its opposite end is provided with an orifice 18, which engages the shouldered end 19 of the adjusting-screw 20, mounted in the adjustable lug 21, the leg 22 of which passes through the longitudinal slot 23 in the plate 6. Said lug 21 is adjustably secured in place in said slot by a taper-key 24, passing through an orifice 25 in the leg 22, in the same manner set forth in the description of the tool-post.

26 represents the roll to be grooved. It is first mounted in the standards 3 3' 3 3', and a templet or pattern 26' is secured to its periphery a little to one side of where the groove is to be cut by means of the sunken-head set-screws 27, which rigidly secure said pattern to the roll, so as to turn with it. When in this position the friction-roller on the laterally-projecting stud 28 on the grooving-tool 15 presses against the periphery of the templet or pattern, being held in contact therewith by the spring 17, pressing against the rear of the grooving-tool, and it will readily be seen that when the roll 26 is rotated by any suitable means in the direction of the arrow the spring presses the grooving-tool forward, and the tool continues cutting a true groove until its pin comes in contact with the highest point on the pattern. This prevents the tool from being pressed into the groove any farther, and as the roll and the pattern continue to revolve the depth of the cutting edge of the tool gradually conforms to the outline of the pattern. Consequently the outline of the groove is a facsimile of the reverse of the outline of the pattern. When this is done, the roller on the stud 28 bears equally around the face of the pattern and the tool ceases cutting. The roll is then removed from the standards and the pattern removed from the roll is ready for use, a pair of them being mounted in the relative positions shown in Fig. 4. When a heated bar of iron is fed between them, it will assume the shape of the blank shown in Fig. 6.

As shown in Fig. 8, the grooving-tool is provided with a cutting edge 29 and a slot 30, which receives the screw-threaded shank 31 of the stud 28, carrying the friction-roller, and by means of the nut 32 the stud and its roller may be adjusted with reference to the cutting edge of the tool to cut the grooves in the roller deeper or shallower, as occasion requires, and also to compensate for the wear of the cutting edge due to use and sharpening.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A machine for grooving rolls for rolling-mills, comprising the adjustable cross-arms, provided with standards 3 3' and integral lugs 4 having lag-screws 5, and the plate 6 provided with the slot 23, the adjustable lug 21 having the adjusting-screw 20, the spring 17 secured at one end to the stud 16 on the face of the plate 6, also provided with the longitudinal slot 7, in combination with the tool-post 9, adjustably secured in said slot 7, and provided with the rectangular slot 14, the grooving-tool 15, mounted in said slot 14 and provided with a laterally-projecting stud 28, and the pattern 26 removably secured to the roll by means of the sunken-head set-screws 27, substantially as and for the purpose set forth.

2. A machine for making irregular grooves in the rolls of rolling-mills, comprising the pattern secured to the roll, the tool-rest, the tool-post adjustably secured therein, and the grooving-tool mounted in said tool-post and provided with a slot 30, in which is adjustably secured the stud 28, on the projecting end of which is mounted a friction-roller, substantially as shown and described.

3. A machine for grooving the rolls of rolling-mills, comprising the bed-frame 1, the adjustable cross-arms 2 2, having standards 3 3', and integral lugs 4 provided with lag-screws 5, the plate 6 secured on said arms, between the standards 3 3' and the lugs 4, by said lag-screws, and provided with the stud 16, the spring 17 having one end secured to said stud, the adjusting-screw 20 engaging the opposite end of said spring and mounted in the lug 21, the leg 22 of which is adjustably secured in a slot 23 in said plate, in combination with the tool-post 9 adjustably secured in the longitudinal slot 7 in said plate 6, and provided with the rectangular slot 14, the grooving-tool 15 mounted in said slot, and provided with a slot 30, a stud 28 adjustably secured therein and provided with a friction-roller, and the pattern or templet 26, against the periphery of which said friction-roller on the stud 28 bears, substantially as and for the purpose set forth.

In testimony whereof I hereunto affix my signature in presence of two witnesses.

JACOB GILBERT WALTER.

Witnesses:
ROSE R. O'TOOLE,
PHILIP HALTON.